Oct. 28, 1941.  E. H. MUELLER  2,260,474
GAS COCK
Filed April 5, 1940
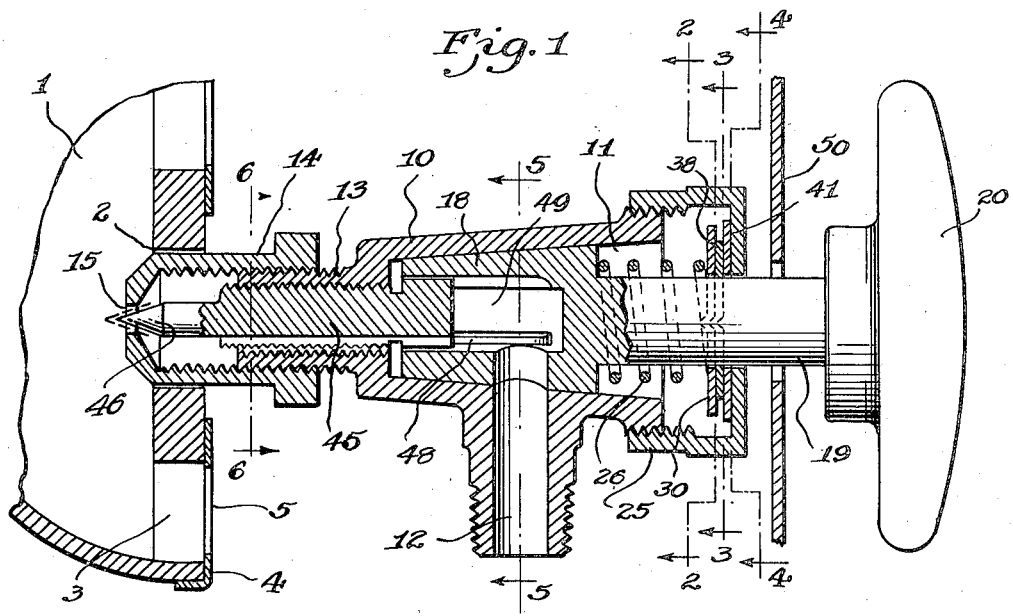
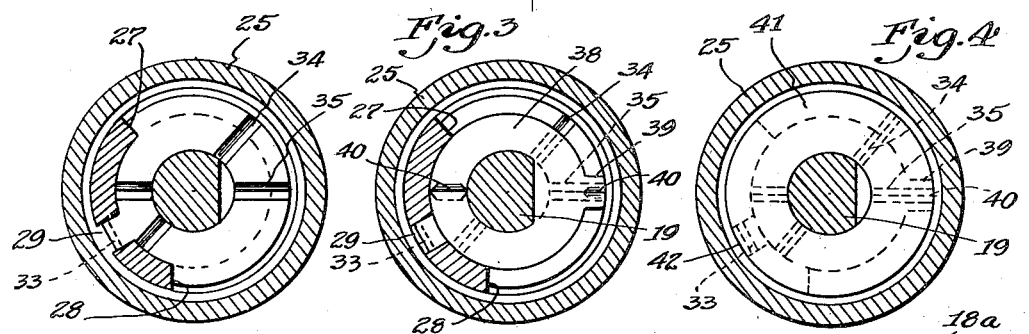
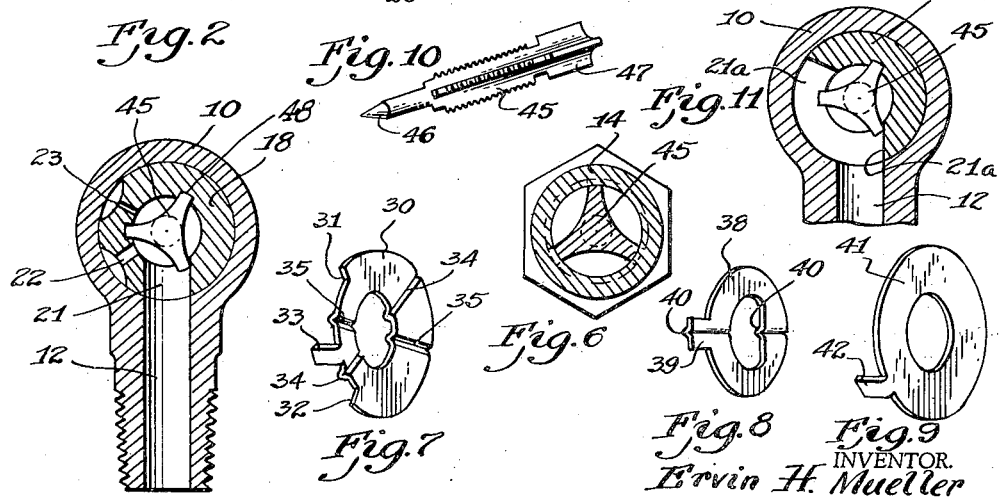
INVENTOR.
Ervin H. Mueller
BY Barnes, Kisselle, Laughlin & Raisch
ATTORNEYS Patented Oct. 28, 1941

2,260,474

UNITED STATES PATENT OFFICE 2,260,474

GAS COCK

Ervin H. Mueller, Grosse Pointe Park, Mich.

Application April 5, 1940, Serial No. 328,077

1 Claim. (Cl. 277—32)

This invention relates to a gas cock, particularly for use with a gas burner, as for example, gas stoves or other gas heating apparatus.

The invention is directed particularly to a gas cock wherein a gas flow passage is automatically adjusted as to size or area in the operation of the gas cock. More particularly, the invention is directed to a gas cock wherein the controlled passage is an outlet passage and which indeed may be the outlet orifice. The invention is applicable to a gas cock which has a rotatable plug operable by the usual handle, by means of which the gas cock may be opened or closed, and in conjunction with the rotatable plug, a shiftable control member is provided and which shifts to control a gas flow passage incident to rotary movements of the plug. The invention is applicable to a gas cock wherein the plug itself is arranged to provide a substantially constant and relatively large passage for the gas, and it is also applicable to a gas cock which is arranged to provide varying volumes to the burner. In this latter case the gas cock may be one which is adjustable by rotary movements of the plug for a full volume or flow of gas for a high flame and may have one or more other rotary positions for the flow of lower volumes of gas for one or more lower flames. A valve structure for carrying out the invention is shown in the accompanying drawing.

Fig. 1 is a cross sectional view of a valve made in accordance with the invention and illustrating a portion of the gas burner, as well as a panel part of a stove or the like.

Fig. 2 is a view taken on line 2—2 of Fig. 1 showing one of the members for aiding in the positioning of the valve.

Fig. 3 is a cross sectional view taken on line 3—3 of Fig. 1 illustrating washer members which cooperate in aiding in the positioning of the valve.

Fig. 4 is a view taken substantially on line 4—4 of Fig. 1 showing a non-rotatable washer.

Fig. 5 is a cross sectional view taken on line 5—5 of Fig. 1 showing the gas cock in full open position.

Fig. 6 is a cross sectional view taken substantially on line 6—6 of Fig. 1 illustrating the outlet passage and a needle valve control.

Fig. 7 is a perspective view of a washer member fixed relative to the valve casing.

Fig. 8 is a perspective view of a washer member fixed to rotate with the rotatable plug of the valve.

Fig. 9 is a perspective view of a non-rotating washer.

Fig. 10 is a view showing the needle orifice control member.

Fig. 11 is a cross sectional view taken through a valve structure and which is similar to Fig. 5 but which shows a valve arrangement where the plug provides only a relatively wide open passage arrangement.

The illustration in Fig. 1 shows a part of the mixing tube of a burner for a gas stove or the like at 1 having an opening 2 for the outlet end of the valve, and openings 3 for air, the size of which may be controlled by a rotatable member 4 having openings 5 which may be brought into and out of, or partially into, registration with the openings 3. This may be the usual and well known construction.

The valve illustrated has a body 10 with a chamber 11 constituting a valve seat and an inlet 12 arranged to be attached to a gas supply pipe and a screwthreaded extension 13 for the reception of an outlet hood 14 having an outlet orifice 15. A valve member 18 is disposed in the chamber and arranged to be turned through the means of its stem 19, mounted upon which is a handle 20. As shown in Fig. 5, the valve plug 18 has a port 21 for full flow of gas, another port 22 for an intermediate flow of gas and a port 23 for a smaller flow of gas, the ports 22 and 23 preferably having enlarged or countersunk outer ends to keep the small ports from being filled or choked with lubricant. In the position shown in Fig. 5, the valve is open for a relatively large flow of gas thus to support a high flame. When the valve is turned counter-clockwise to align the port 22 with the inlet 12, a smaller flow of gas is obtained for an intermediate flame, and when the still smaller port 23 is aligned with the inlet 12, a still smaller and so-called simmer flame is provided. Thus the valve has three "on" positions, namely, full, intermediate, and simmer. When the plug valve 18 is turned clockwise from the position shown, the inlet 12 is closed. A valve which embodies this structure does not necessarily have the ports 22 and 23 accurately gauged for the ultimate flow of smaller volumes as these ports serve in effect as pressure reducing ports with the ultimate volume controlled by the controlling valve as will later appear.

The stem 19 passes out through a cap 25 and a spring 26 serves to hold the valve 18 on its seat. The valve housing is cut away to form a shoulder 27 and a shoulder 28, and it is also provided with a notch 29. A washer member 30 fashioned somewhat into fan shape with shoulders 31 and 32, is placed over the stem with the shoulders 31 and 32 disposed against the shoulders 27 and 28. The washer may have a key 33 which fits into the slot 29. Thus this washer is held against rotation relative to the body. The washer may be of stamped metal and may be formed with notches 34 and 35, the notches as shown being separated by the central aperture.

Over the washer 30 is another washer 38 arranged to rotate with the stem, to which end the stem has a flat side so that it is D shaped in cross section, while the washer 38 has a similarly shaped aperture for fitting thereon. This washer has an extension 39 and it is fashioned with a projection 40 for cooperation with the notches 34 and 35. This washer is located so that the extension 39 operates between the shoulders 28 and 27 of the valve body. Since this washer turns with the stem, another washer 41 is preferably disposed between the washer 38 and cap, and it has a key 42 also for fitting in the slot 29 in an overlapping relationship with the key 33. Thus in the turning of the valve and washer 38 there is no turning action on the cap which may tend to turn the cap on its screw-threads.

When the valve is in "off" position the projection 39 abuts the shoulder 28. This will be appreciated by a consideration of Figs. 2, 3 and 5. When the valve is turned to full "on" position, as shown in Fig. 5, the projection 40 is caused to seat in the groove 35 under the action of a spring 26, which shifts the washer 30 axially to the right as Fig. 1 is viewed. When the valve is turned further counter-clockwise, as Fig. 5 is viewed, to align the intermediate portion 22 with the inlet, the projection 40 is engaged by the recess 34. When the valve is turned still further counter-clockwise, as Fig. 5 is viewed, to align the simmer port with the inlet, the projection 29 strikes the shoulder 27. Thus the valve has four positions; off position and simmer position occur at the limit of rotation of the valve plug determined by the projection 39 striking the shoulders 28 and 27; the two intermediate positions, namely, for the full supply of gas and intermediate supply of gas, are determined by the interengagement of the notches 34 and 35 with the projection 40.

When the projection 40 is not in one of the recesses it is riding upon the surface of the washer 30. When the projection 40 engages with either one of the notches 34 or 35, there is a slight arresting action so that knowledge of the position of the valve is imparted to the user, and then, too, the spring may shift the washer axially with a snap action which may be appreciated by sound.

A needle valve 45, having a needle valve portion 46, is threaded in the outlet end of the valve housing and the member has ridges which are threaded on their edges so that the valve is shaped for the passage of gas, as shown in Figs. 5 and 6. The opposite end 47 of the needle member has its ridges slidably engaged in slots or ways 48 in the gas passage 49 of the plug 18. Gas cocks on gas stoves of the design in vogue at present are usually concealed by a panel or the like so that only the handle is accessible. This is shown in Fig. 1 where paneling is illustrated at 50 having an opening therethrough for the passage of the stem.

The initial setting up and operation of the valve is as follows: The hood 14 is adjusted to adapt the valve to the existing conditions, and paramount among those conditions is the pressure and type of gas with which the valve is to be used. The hood 14 may be adjusted with the valve in wide open position as shown in Fig. 5 in order to obtain the proper flame characteristics. It will be seen that by turning the hood on its screw-thread it is fed one way or the other relative to the needle valve, and thus the size and proportions of the jet orifice 15 adjusted. After such a proper adjustment is made, the hood is then not ordinarily adjusted in use as such adjustment is relatively permanent. Accordingly, no access to the valve is ordinarily required and it may conveniently be used where it is concealed as by the panel 50.

One purpose for the orifice adjustment is to obtain a desired forceful jet action on the gases issuing from the jet orifice into the mixing tube 1 so as to cause the gas to move properly through the tube to the burner and to draw into the mixing tube primary air through the openings 3. It will be seen that as the plug valve is turned the needle valve is rotated with it, and the needle valve, accordingly, is fed back and forth in its threads, the end 47 sliding in the ways 48. When the valve is in full "on" position, as shown in Fig. 5, the needle valve may be in approximately the full line position as shown in Fig. 1. As the valve 18 is turned counter-clockwise, say to the intermediate position, the needle valve is turned on its threads and it shifts to the left, thus throttling the jet aperture 15. If the valve be turned further counter-clockwise to the simmer position, thus aligning the smaller port 23 of the inlet, the needle valve is further projected to the left, as Fig. 1 is viewed, thus further throttling the jet aperture. A relatively forward position of the needle valve is shown in dotted lines in Fig. 1. With the arrangement shown, where the plug 18 is rotated counter-clockwise, the threads of the needle valve will be left hand threads so that it is projected forwardly in the action of moving the valve toward intermediate and simmer positions. When the valve 18 is adjusted to its intermediate or simmer position, a lesser volume of gas is permitted to flow through the cock, and therefore it is desirable to adjust the outlet jet. If the outlet jet be adjusted for a full flow of gas, then it may be too large for a small flow of gas, with the result that the jet is not projected in a sufficiently high velocity stream. In this arrangement the needle valve 46 may be the primary control for the passage of gas through the cock. When the valve is adjusted, however, to advance the needle 46, and restrict the orifice, it may be necessary under some conditions to reduce the pressure of the gas flow to the orifice. Otherwise the pressure may be too great and cause the gas to flow through the choked orifice with a velocity which is too high, and the flame may be blown away from the burner. Accordingly, the orifice 22 offers a restriction to reduce the pressure when the needle valve is in intermediate position, while the orifice 23 offers a further restriction when the needle valve is adjusted to simmer position. Therefore, it may be said that the needle may be the ultimate adjustment; the ports 22 and 23 in effect constitute resistances in the line.

Now under some conditions, this needle valve adjustment may be used satisfactorily without the intermediate and simmer small ports. A valve of this design is shown in Fig. 11. This valve structure may otherwise be identical with the one previously described and differs only in that the plug 18a is provided with an elongated slot or opening 21a which is of sufficient length as to be aligned or partially aligned with the inlet in all the various open positions. Thus there is no restriction offered to the gases which pass to the metered orifice as the opening 21a provides a passage of uniform size substantially in all open positions. This arrangement can be used under some conditions, especially where the pressure of the gas supply is not too high and the gas has a high rate of flame propagation.

I claim:

A gas valve comprising a valve body having a valve chamber therein with an inlet into the side of the chamber and an outlet axially at the end of the chamber, a valve member seated in the chamber and having an axial bore communicating with the outlet, said valve member having a plurality of inlet ports of different sizes spaced circumferentially from each other leading into the bore and which are adapted upon rotation of the valve member to be selectively aligned with the inlet for the flow of different volumes of gas through the valve, means providing an outlet orifice in communication with the outlet in the valve body, the outlet in the valve body having internal screw-threads, a second valve member for controlling the outlet orifice having an intermediate body portion of ribbed formation with screw-threads on the crest of the ribs and which is screw-threaded into the body outlet so that gas may pass therethrough, one end of the second valve member having a needle formation for co-operation with the outlet orifice, the other end of the second valve member extending into the bore of the first valve member and having a non-rotatable and slidable connection therewith whereby, upon turning of the first valve member in either direction for selection of the port to be aligned with the inlet, the second valve member is rotated therewith and fed on its screw-threads axially with substantially uniform movement in either direction so that the needle formation thereof throttles the outlet orifice substantially in accordance with the port aligned with the inlet.

ERVIN H. MUELLER.